United States Patent
Beer Mohideen et al.

(10) Patent No.: US 12,475,589 B1
(45) Date of Patent: Nov. 18, 2025

(54) RECOVERING CAMERA POSITION FROM CONTENT FILE

(71) Applicant: Amazon Technologies, Inc., Seattle, WA (US)

(72) Inventors: Sheik Dawood Beer Mohideen, Mountlake Terrace, WA (US); Maxim Arap, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 350 days.

(21) Appl. No.: 18/208,623

(22) Filed: Jun. 12, 2023

(51) Int. Cl.
*G06T 7/70* (2017.01)
*G06T 7/246* (2017.01)
*G06T 7/50* (2017.01)
*G06V 10/74* (2022.01)

(52) U.S. Cl.
CPC ........... *G06T 7/70* (2017.01); *G06T 7/246* (2017.01); *G06T 7/50* (2017.01); *G06V 10/761* (2022.01)

(58) Field of Classification Search
CPC .. G06T 7/70; G06T 7/246; G06T 7/50; G06V 10/761
USPC ........................................................ 382/103
See application file for complete search history.

(56) References Cited

U.S. PATENT DOCUMENTS 11,102,417 B2 * 8/2021 Shen .................... H04N 23/61

FOREIGN PATENT DOCUMENTS

WO  WO-2022194158 A1 * 9/2022 ............... G06T 7/73

* cited by examiner

*Primary Examiner* — Neil R Mclean
(74) *Attorney, Agent, or Firm* — Kilpatrick Townsend & Stockton LLP

(57) ABSTRACT

Camera positions can be recovered for video frames. Keypoint tracks can be generated for a first video frame and subsequent video frames. Metric depth can be determined for the video frames. An image databased can be generated using the keypoint tracks and the metric depth. The image database can include the video frames. A first video frame having a highest number of keypoint tracks can be identified. A first projection into a three-dimensional model can be generated for the first video frame and a first matching video frame. A camera position can be generated using the first projection. A second video frame having a next-highest number of keypoint tracks can be identified. A second projection into a three-dimensional model can be generated for the second video frame and a second matching video frame. A camera position can be generated using the second projection.

20 Claims, 7 Drawing Sheets

RECOVERING CAMERA POSITION FROM CONTENT FILE

BACKGROUND

Various content files and data can include video data that can include video frames. The video frames may each include one or more images that may have been captured by a camera or other device that can capture and/or record images or video. The content files may not indicate a position, such as a trajectory, a focal point, a focus, etc., of the camera. Additionally, determining the position of the camera without indications of the position included in the content files may be difficult.

BRIEF DESCRIPTION OF THE DRAWINGS

Various embodiments in accordance with the present disclosure will be described with reference to the drawings, in which.

DETAILED DESCRIPTION

Figure 1:
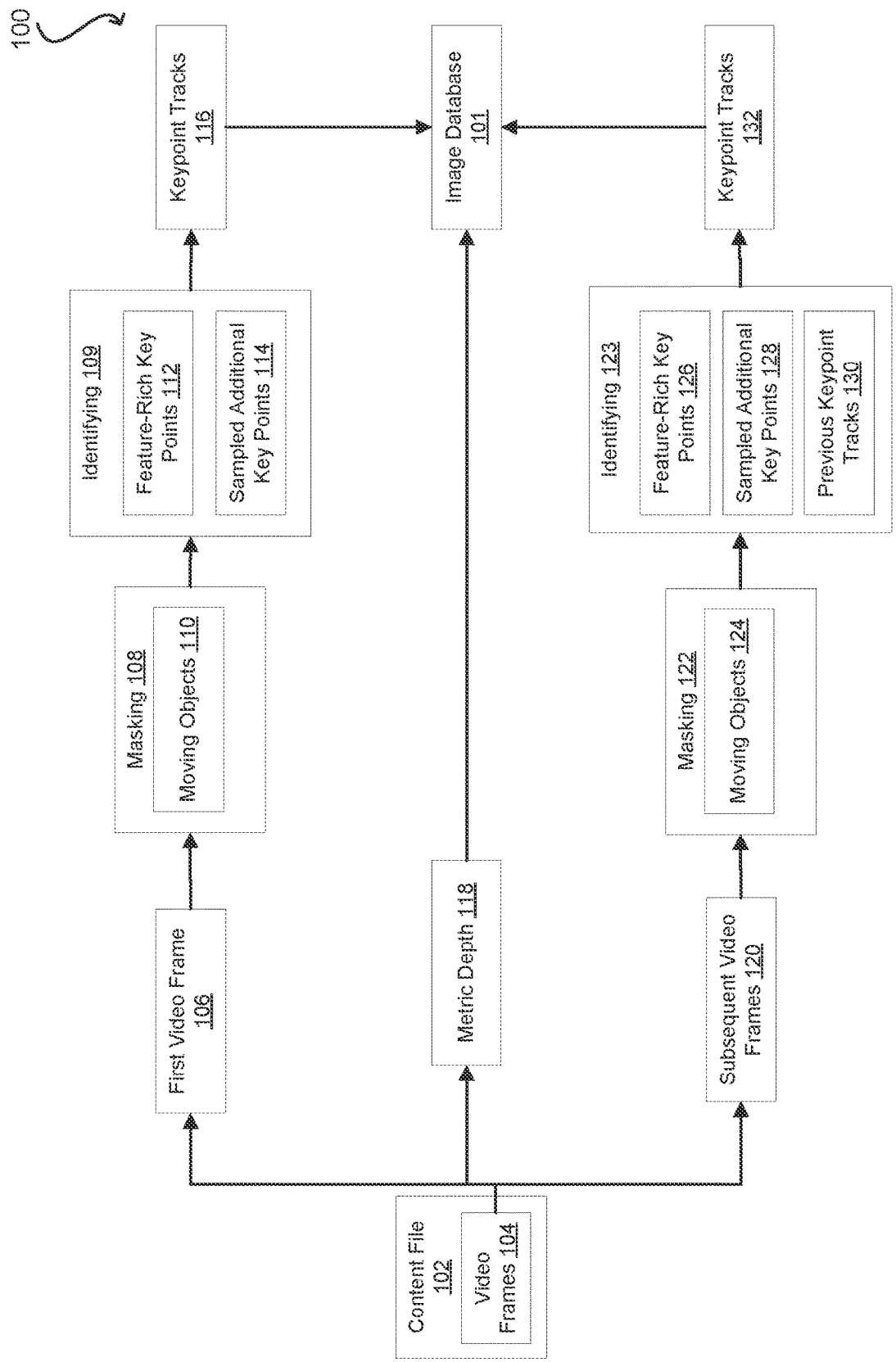
FIG. 1 illustrates a flow diagram of a data flow for generating an image database based on keypoint tracks included in one or more video frames of a content file in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Certain aspects and features of the present disclosure relate to recovering or otherwise determining a camera position for one or more video frames included in one or more content files. The camera position may include a trajectory (e.g., physical position, height, angle, etc.) of the camera relative to an image indicated or otherwise captured by the camera, may include a focal length used by the camera to capture or indicate the image, may include a sensor size used by the camera to capture or indicate the image, and the like. The one or more content files may be or include video data, which may include a movie, a television show, a podcast, a video intended to be shared or uploaded to a network, such as the Internet, and the like. The one or more video frames may be included in the one or more content files, and a computing device can access the one or more video frames from the content file. For example, the computing device may receive the one or more content files, and the computing device may extract the one or more video frames from the one or more content files. The computing device may be configured to analyze or otherwise process the one or more video frames to recover or otherwise determine the camera position for the one or more video frames. In some embodiments, the computing device may be configured to recover or otherwise determine a camera position for each video frame of the one or more video frames.

In some examples, a content file can include a movie with multiple video frames. Additionally, after capturing the video frames, an entity, such as a video effects editor or any other entity associated with the movie, may make an alteration to a particular video frame. For example, the video effects editor may insert an explosion graphic or other graphical feature into the particular video frame. In other examples, the video effects editor may insert objects, which were not present while capturing the particular video frame, into the particular video frame. A position of the camera used to capture the particular video frame may be used to insert the graphical features, the objects, or the like into the particular video frame without obstructing an experience provided by the particular video frame, without degrading a quality of the particular video frame, etc.

The computing device can perform one or more techniques such as an enhanced structure from motion (SFM) to recover a camera position from the particular video frame. For example, the computing device can mask the particular video frame and identify key points included in the video frame. Masking the particular video frame can involve identifying moving objects, such as motor vehicles, persons, flying objects, etc., to avoid tracking and can involve identifying feature-rich key points, such as stationary objects having multiple angles, surfaces, or other identifiable key points, to track. The computing device can also identify sampled additional key points outside of the masks to track. The computing device can use the feature-rich key points and the sampled additional key points to generate keypoint tracks for the particular video frame and for one or more additional video frames. For example, the computing device can track the feature-rich key points and the sampled additional key points across a predetermined number of video frames from the particular video frame. In a particular example, the computing device can track the feature-rich key points and the sampled additional key points from the particular video frame across the next seven video frames, though any other suitable number (e.g., less than seven or more than seven) of subsequent video frames is possible. Additionally or alternatively, the computing device can determine, for the particular video frame, a metric depth and can generate an image database configured to store a set of video frames having corresponding metric depths and keypoint tracks.

In some embodiments, for example in response to generating keypoint tracks and determining the metric depths for each video frame of the set of video frames, the computing device can access the image database to recover or otherwise determine the camera position for the particular video frame. The computing device can identify a separate video frame that at least approximately matches the particular video frame with respect to keypoint tracks, and the computing device can use the particular video frame and the separate video frame to recover the camera position. In some examples, the computing device can use one or more computer algorithms, one or more machine-learning models, or the like to recover the camera position. For example, the computing device can project the images indicated by the particular video frame and by the separate video frame into a three-dimensional model, which can be used by the computing device to triangulate the camera position between the particular video frame and the separate video frame. Additionally or alternatively, in examples in which a difference between a first camera position of the particular video frame and a second camera position of the separate video frame is approximately zero or negligible, the computing device can use the metric depths of the particular video frame and of the separate video frame to recover the camera position.

Techniques described herein include recovering a camera position for one or more video frames of a content file. A computing device, such as a server computer, a personal computing device, a mobile computing device, etc. can receive video frames from the content file. An initial video frame of the video frames can be selected, and the computing device can identify first feature-rich key points and first sampled additional key points for the initial video frame. The computing device can generate first keypoint tracks for the initial video frame based on the first feature-rich key points and the first sampled additional key points. The computing device can proceed with the remaining video frames. For example, the computing device can, for each subsequent video frame of the video frames, identify second feature-rich key points and second sampled additional key points. Additionally, the computing device can, for each subsequent video frame of the video frames, identify previously generated keypoint tracks from previously analyzed video frames. And, the computing device can, for each subsequent video frame of the video frames, generate second keypoint tracks based on the second feature-rich key points, the second sampled additional key points, and the previously generated keypoint tracks. The computing device can additionally generate a metric depth for the video frames, and the computing device can generate an image database using the metric depth, the first keypoint tracks, and the second keypoint tracks. In some embodiments, the image database can include the video frames and indications of the first feature-rich key points, the second feature-rich key points, the first sampled additional key points, and the second sampled additional key points.

The computing device can identify a first particular video frame that has a highest number of keypoint tracks among the video frames. Additionally, the computing device can identify, from the image database, a first matching video frame that has the most keypoint tracks matching the highest number of keypoint tracks of the first particular video frame. The computing device can generate a first projection of the first particular video frame and of the first matching video frame into a three-dimensional model of an image indicated by the first particular video frame and of the first matching video frame. Additionally, the computing device can determine a first camera position for the first particular video frame and for the first matching video frame using the first projection. The computing device can identify a second particular video frame that has a next-highest number of keypoint tracks among the video frames. The computing device can identify, from the image database, a second matching video frame that has the most keypoint tracks matching the next-highest number of keypoint tracks of the second particular video frame. Additionally, the computing device can generate a second projection of the second particular video frame and of the second matching video frame into a three-dimensional model of an image indicated by the second particular video frame and of the second matching video frame. The computing device can determine a second camera position for the second particular video frame and for the second matching video frame using the second projection.

In some embodiments, the computing device can mask a first set of pixels included in the first video frame and a second set of pixels included in the first video frame to identify the first feature-rich key points. The first set of pixels can include one or more moving objects, and the second set of pixels can include the first feature-rich key points and can exclude the first set of pixels. Additionally, the computing device can identify a third set of pixels included in the first video frame to identify the first sampled additional key points. The third set of pixels can include the first sampled additional key points included in the first video frame and can exclude the first set of pixels. The third set of pixels may be different than the first set of pixels and the second set of pixels.

In some embodiments, the computing device can track the first feature-rich key points and the first sampled additional key points across one or more subsequent video frames of the plurality of video frames after the first video frame to generate the first keypoint tracks based on the first feature-rich key points and the first sampled additional key points. Additionally, the computing device can project each key point included in the first particular video frame and in the first matching video frame into the three-dimensional model by using the metric depth and a set of focal lengths associated with the first particular video frame and the first matching video frame to generate the first projection. In some embodiments, the set of focal lengths can be determined based on a size of respective video frames, camera properties, such as field of view, length, and the like, etc. Additionally, in some embodiments, the computing device can use a neural network to determine the metric depth. Additionally, the computing device can determine a first estimated camera position for the first particular video frame and a second estimated camera position for the first matching video frame. The computing device can triangulate the first estimated camera position and the second estimated camera position to determine the first camera position.

FIG. 1 illustrates a flow diagram 100 of a data flow for generating an image database 101 based on keypoint tracks included in one or more video frames of a content file 102 in accordance with at least one embodiment. In some embodiments, the flow and/or operations associated with the flow diagram 100 may be performed by one or more computing devices such as a server computer, a personal computing device, a mobile computing device, or the like, or any combination thereof, referred to herein after as "the computing device."

As illustrated, the flow diagram 100 can begin with the content file 102. The computing device may access or otherwise receive the content file 102. For example, the computing device may query a database to receive the content file 102, or, in other examples, the computing device may receive the content file 102 from a separate computing device operated by an entity that caused the separate computing device to transmit the content file 102 to the computing device. The content file 102 may include video frames 104, which may include one video frame, two video frames, three video frames, four video frames, or more video frames. In some embodiments, the content file 102 may be or include a video file, such as a movie, a television show, a podcast, etc., that may include a set of video frames that includes the video frames 104. Each video frame of the video frames 104 may be or include an image captured by a camera or other device configured to capture and/or store an image. The image may indicate a set of real-world objects, a set of artificial (e.g., animated, AI-generated, etc.) objects, or a combination thereof.

In some embodiments, the computing device can identify a first video frame 106 of the video frames 104. The computing device can perform one or more masking operations at masking 108 and one or more identification operations at identifying 109. For example, the computing device can mask or identify moving objects 110, can mask or identify feature-rich key points 112, and can mask or identify sampled additional key points 114, which may be uniformly sampled among key points of the respective video frame or may be non-uniformly sampled among key points of the respective video frame. Each of the moving objects 110, the feature-rich key points 112, and the sampled additional key points 114 can be included in an image indicated by the first video frame 106. The moving objects 110 can include motor vehicles, bicycles, persons, objects in motion, or any other object or combination of objects that may be likely to change position relative to a stationary reference point. In a particular example, the moving objects 110 can include an automobile in motion and a basketball that has been thrown by an individual. Masking the moving objects 110 may involve applying a first mask, a first tag, or the like to a first set of pixels that indicates or represents the moving objects 110. The computing device may ignore or otherwise not use the first set of pixels for further processing to recover the camera position for the first video frame 106 or, in some embodiments, any other video frame of the video frames 104.

The feature-rich key points 112 can include key points included in the first video frame 106. Feature-rich key points 112 may include key points having features, such as features with high density, that can be easily tracked across multiple video frames. For example, the feature-rich key points 112 can include edges, corners, shapes, shading, and the like for one or more objects included in the first video frame 106. In a particular example, the feature-rich key points 112 can include a coffee maker having multiple edges, corners, shapes, shadings, etc. Additionally or alternatively, the feature-rich key points 112 may not move or may not be configured to move across multiple video frames of the video frames 104 and relative to a stationary reference point. Identifying the feature-rich key points 112 may involve applying a second mask, a second tag, or the like to a second set of pixels that indicates or represents the feature-rich key points 112. The computing device may use the second set of pixels for further processing to recover the camera position for the first video frame 106 or, in some embodiments, any other video frame of the video frames 104.

The sampled additional key points 114 can include key points included in the first video frame 106 that may not be included in the feature-rich key points 112. The sampled additional key points 114 may include key points having features that can be easily tracked across multiple video frames. In some examples, the sampled additional key points 114 may include key points having a density of features that can be easily tracked falling below a threshold number, and the feature-rich key points 112 may include key points having a density of features that can be easily tracked above the threshold number. The sampled additional key points 114 can include edges, corners, shapes, shading, and the like for one or more objects included in the first video frame 106. In a particular example, the sampled additional key points 114 can include a wall having multiple edges, corners, shapes, shadings, etc. Additionally or alternatively, the sampled additional key points 114 may not move or may not be configured to move across multiple video frames of the video frames 104 and relative to a stationary reference point. Identifying the sampled additional key points 114 may involve applying a third mask, a third tag, or the like to a third set of pixels that indicates or represents the sampled additional key points 114. The computing device may use the third set of pixels for further processing to recover the camera position for the first video frame 106 or, in some embodiments, any other video frame of the video frames 104. In some embodiments, the first set of pixels, the second set of pixels, and the third set of pixels may each be different from one another, or at most, partially overlap one another.

The computing device can use the moving objects 110, the feature-rich key points 112, and the sampled additional key points 114, or any set of pixels thereof, to generate keypoint tracks 116 for the first video frame 106 and, in some examples, a set of subsequent video frames of the video frames 104. For example, the computing device can project the moving objects 110, the feature-rich key points 112, the sampled additional key points 114, any set of pixels thereof, or any subset thereof across a set of subsequent video frames, which may include any suitable number of video frames. In a particular example, the computing device can project or otherwise propagate the moving objects 110, the feature-rich key points 112, the sampled additional key points 114, any set of pixels thereof, or any subset thereof across the subsequent seven video frames to track the moving objects 110, the feature-rich key points 112, the sampled additional key points 114, any set of pixels thereof, or any subset thereof to generate the keypoint tracks 116, though different numbers other than seven for the subsequent video frames are possible. Each keypoint track of the keypoint tracks 116 may track a different key point of the feature-rich key points 112 or of the sampled additional key points 114 from the first video frame 106 to the set of subsequent video frames. Additionally, the computing device can determine or generate a metric depth 118, or one or more metric depths, of the first video frame 106. The computing device can save the keypoint tracks 116, the metric depth 118, and/or updated versions of the first video frame 106 and the set of subsequent video frames having the keypoint tracks 116 and/or the metric depth 118 to the image database 101.

In some embodiments, the computing device can select one or more subsequent video frames, such as subsequent video frame 120, the one or more subsequent video frames including one video frame, two video frames (separately selected and/or processed), three video frames (separately selected and/or processed), or more video frames (separately selected and/or processed). The computing device can, at masking 122 and/or at identifying 123, perform one or more masking operations and/or perform one or more identification operations on the subsequent video frame 120. For example, the computing device can mask or identify moving objects 124, can mask or identify feature-rich key points 126, can mask or identify sampled additional key points 128, can mask or identify previous keypoint tracks 130, etc. Each of the moving objects 124, the feature-rich key points 126, the sampled additional key points 128, and the previous keypoint tracks 130 can be included in an image indicated by the subsequent video frame 120. The moving objects 124, similar to the moving objects 110, can include motor vehicles, bicycles, persons, objects in motion, or any other object or combination of objects that may be likely to change position relative to a stationary reference point. In a particular example, the moving objects 124 can include an automobile in motion and/or a basketball that has been thrown by an individual. Masking the moving objects 124 may involve applying a first mask, a first tag, or the like to a first set of pixels included in the subsequent video frame 120 that indicates or represents the moving objects 124. The computing device may ignore or otherwise not use the first set of pixels for further processing to recover the camera position for the subsequent video frame 120 or, in some embodiments, any other video frame of the video frames 104.

The feature-rich key points 126 can include key points included in the subsequent video frame 120. The feature-rich key points 126 may, similar to the feature-rich key points 112, include key points having features that can be easily tracked across multiple video frames. For example, the feature-rich key points 126 can include edges, corners, shapes, shading, and the like for one or more objects included in the subsequent video frame 120. In a particular example, the feature-rich key points 126 can include a coffee maker having multiple edges, corners, shapes, shadings, etc. Additionally or alternatively, the feature-rich key points 126 may not move or may not be configured to move across multiple video frames of the video frames 104 and relative to a stationary reference point. Identifying the feature-rich key points 126 may involve applying a second mask, a second tag, or the like to a second set of pixels included in the subsequent video frame 120 that indicates or represents the feature-rich key points 126. The computing device may use the second set of pixels for further processing to recover the camera position for the subsequent video frame 120 or, in some embodiments, any other video frame of the video frames 104.

The sampled additional key points 128 can include key points included in the subsequent video frame 120 that may not be included in the feature-rich key points 126. The sampled additional key points 128 may, similar to the sampled additional key points 114, include key points having features that can be easily tracked across multiple video frames. In some examples, the sampled additional key points 128 may include key points having a density of features that can be easily tracked falling below a threshold number, and the feature-rich key points 126 may include key points having a density of features that can be easily tracked above the threshold number. The sampled additional key points 128 can include edges, corners, shapes, shading, and the like for one or more objects included in the subsequent video frame 120. In a particular example, the sampled additional key points 128 can include a wall having multiple edges, corners, shapes, shadings, etc. Additionally or alternatively, the sampled additional key points 128 may not move or may not be configured to move across multiple video frames of the video frames 104 and relative to a stationary reference point. Identifying the sampled additional key points 128 may involve applying a third mask, a third tag, or the like to a third set of pixels included in the subsequent video frame 120 that indicates or represents the sampled additional key points 128. The computing device may use the third set of pixels for further processing to recover the camera position for the subsequent video frame 120 or, in some embodiments, any other video frame of the video frames 104.

The previous keypoint tracks 130 can include previously identified keypoint tracks, stored keypoint tracks, or the like. For example, the previous keypoint tracks 130 can include the keypoint tracks 116 determined for the first video frame 106, though other suitable previously identified or stored keypoint tracks can be included in the previous keypoint tracks 130. Masking and/or identifying the previous keypoint tracks 130 may involve applying a fourth mask, a fourth tag, or the like to a fourth set of pixels included in the subsequent video frame 120 that indicates or represents the previous keypoint tracks 130. The computing device may use the fourth set of pixels for further processing to recover the camera position for the subsequent video frame 120 or, in some embodiments, any other video frame of the video frames 104. In some embodiments, the first set of pixels, the second set of pixels, the third set of pixels, and the fourth set of pixels may each be different from one another. In other embodiments, the first set of pixels, the second set of pixels, the third set of pixels, and the fourth set of pixels may at least partially overlap one another.

The computing device can use the moving objects 124, the feature-rich key points 126, the sampled additional key points 128, the previous keypoint tracks 130, or any set of pixels thereof, to generate keypoint tracks 132 for the subsequent video frame 120 and, in some examples, a set of subsequent video frames of the video frames 104. For example, the computing device can project the moving objects 124, the feature-rich key points 126, the sampled additional key points 128, the previous keypoint tracks 130, any set of pixels thereof, or any subset thereof across a set of subsequent video frames, which may include any suitable number of video frames. In a particular example, the computing device can project or otherwise propagate the moving objects 124, the feature-rich key points 126, the sampled additional key points 128, the previous keypoint tracks 130, any set of pixels thereof, or any subset thereof across the subsequent seven video frames to track the moving objects 124, the feature-rich key points 126, the sampled additional key points 128, the previous keypoint tracks 130, any set of pixels thereof, or any subset thereof to generate the keypoint tracks 132, though different numbers other than seven for the subsequent video frames are possible. Each keypoint track of the keypoint tracks 132 may track a different key point of the feature-rich key points 126, of the sampled additional key points 128, or of the previous keypoint tracks 130 from the subsequent video frame 120 to the set of subsequent video frames. Additionally, the computing device can determine or generate a metric depth 118, or one or more metric depths, of the subsequent video frame 120. The computing device can save the keypoint tracks 132, the metric depth 118, and/or updated versions of the subsequent video frame 120 and the set of subsequent video frames having the keypoint tracks 132 and/or the metric depth 118 to the image database 101.

Figure 2:
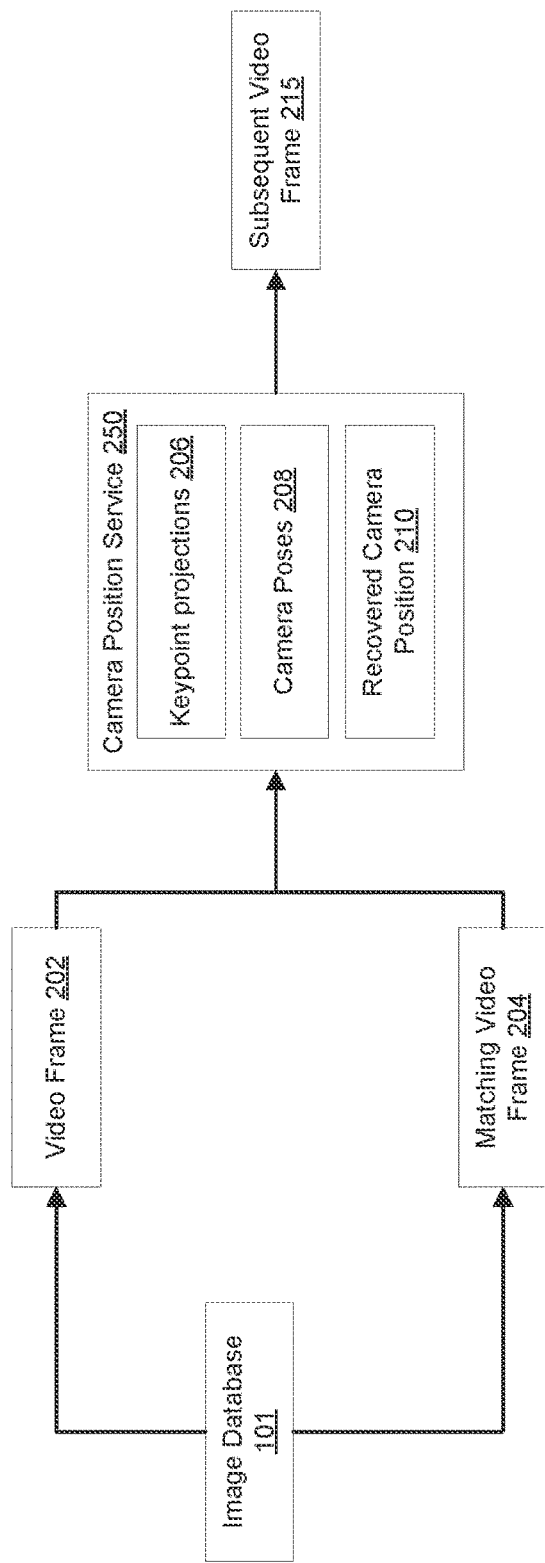
FIG. 2 illustrates a flow diagram of a data flow for recovering a camera position for a video frame in accordance with at least one embodiment.

FIG. 2 illustrates a flow diagram 200 of a data flow for recovering a camera position for a video frame 202 from an image database 101 in accordance with at least one embodiment. In some embodiments, the flow and/or operations associated with the flow diagram 200 may be performed by one or more computing devices such as a server computer, a personal computing device, a mobile computing device, or the like, or any combination thereof, referred to herein after as "the computing device."

As illustrated, the flow diagram 200 may begin with the image database 101. The computing device may access the image database 101 to identify or select video frame 202. Additionally or alternatively, the computing device may receive the video frame 202 from a separate computing device or based on a query submitted to the image database 101 from the separate computing device. In some embodiments, the video frame 202 may have or otherwise include a largest number of keypoint tracks compared with other video frames stored in the image database 101. In a particular example, the computing device can determine, from the video frames stored in the image database 101, that the video frame 202 has the most keypoint tracks among the video frames stored in the image database 101. The computing device can additionally identify a matching video frame 204 that can have the highest number of keypoint tracks matching the keypoint tracks of the video frame 202. The computing device can use the video frame 202 and the matching video frame 204 to recover a camera position for the video frame 202 and/or the matching video frame 204.

The computing device can execute a camera position service 250 to recover the camera position. In some embodiments, the camera position service 250 can involve keypoint projections 206, estimated camera positions 208, and a recovered camera position 210. For example, the camera position service 250 can project, via the keypoint projections 206, each key point, or any other suitable points or pixels, included in the video frame 202 and in the matching video frame 204 into a three-dimensional model. The three-dimensional model may be or include a virtual, three-dimensional model configured to represent one or more images represented or indicated by the video frame 202 and/or the matching video frame 204. In a particular example, if the video frame 202 and the matching video frame 204 indicate or represent a farmhouse, the three-dimensional model may be or include a virtual reconstruction or representation of the farmhouse, though other suitable examples of objects for the three-dimensional model are possible.

In some embodiments, the computing device can sample a predetermined number of potential focal lengths for the camera position. For each potential focal length, the computing device can use a cached metric depth associated with the video frame 202 and/or the matching video frame 204 and the corresponding focal length to project the key points of the video frame 202 and/or the matching video frame 204 to the three-dimensional model. Additionally, the computing device can determine the estimated camera positions 208 of the video frame 202 and/or the matching video frame 204 using a computer algorithm, a machine-learning model, or the like. In a particular example, the computing device can use a Perspective-n-Point (PnP) algorithm to determine the estimated camera positions 208. The computing device can select the focal length and estimated camera position among the potential focal lengths and the estimated camera positions 208 that produce the best fit or best solution to the computer algorithm, the machine-learning model, or the like.

The computing device can recover or otherwise determine the recovered camera position 210 using the focal length and the estimated camera position. For example, the computing device can triangulate matching key points using the focal length and the estimated camera position. In examples in which differences of estimated camera positions 208 between the video frame 202 and/or the matching video frame 204 are approximately zero or negligible, the computing device can use depth information, such as the metric depth 118, to project the matching key points into the three-dimensional model and average their positions to determine the recovered camera position 210.

Upon determining the recovered camera position 210 for the video frame 202 and/or the matching video frame 204, the computing device can proceed to a subsequent video frame 215 and repeat the above-described techniques to determine the recovered camera position 210 for the subsequent video frame 215 and/or a subsequent matching video frame 220. The computing device can repeat the above-described techniques for each video frame of the video frames 104 or for each video frame stored in the image database 101 until the computing device determines a recovered camera position 210 for each video frame of the video frames 104 or for each video frame stored in the image database 101, or for any subset thereof.

Figure 3:
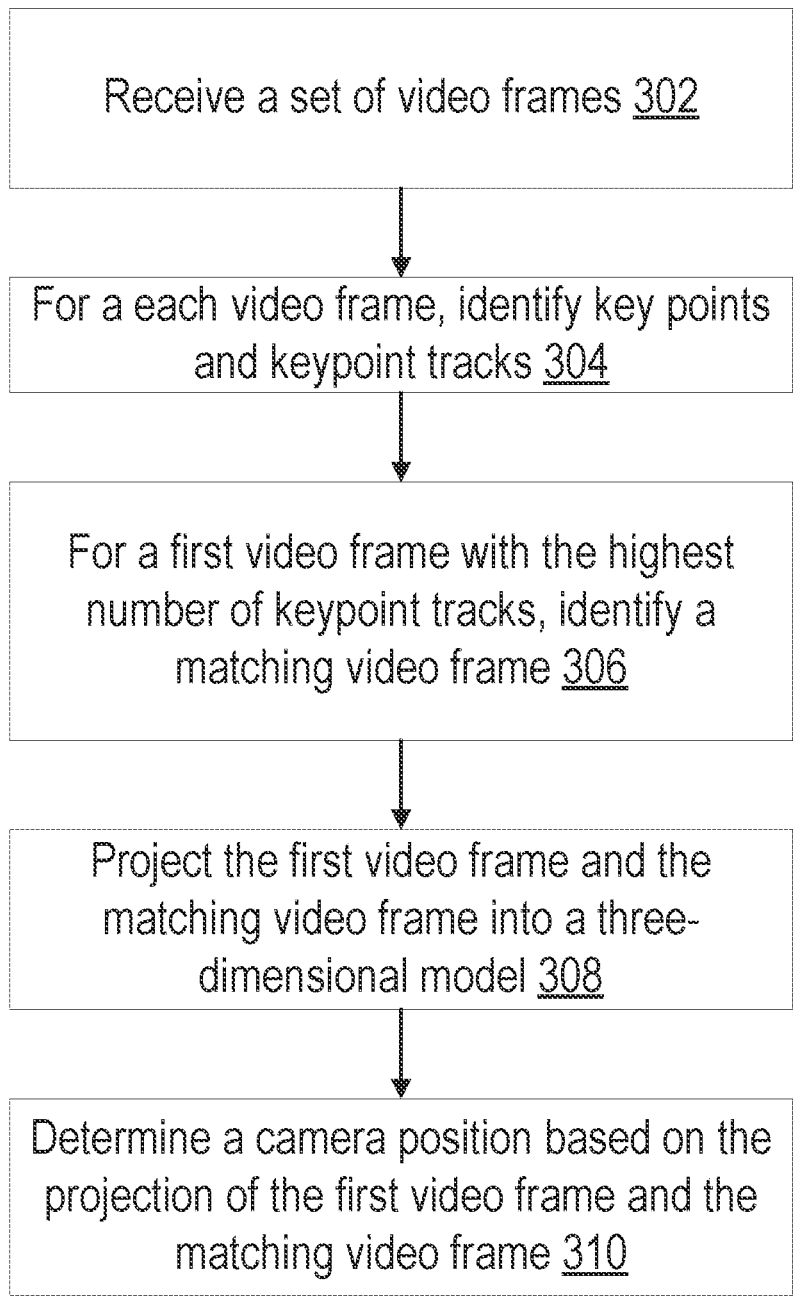
FIG. 3 illustrates a flowchart of a process for determining a camera position for a set of video frames in accordance with at least one embodiment.

FIG. 3 illustrates a flowchart of a process 300 for determining a camera position for a set of video frames in accordance with at least one embodiment. Some or all of the process 300 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

At block 302, the process 300 involves receiving a set of video frames such as the video frames 104. In some embodiments, the computing device may query or otherwise access a data store that includes a content file such as the content file 102. In other examples, the computing device may receive the content file 102 from a separate computing device. The computing device can split the content file 102 into the video frames 104 or may otherwise extract the video frames 104 from the content file 102.

At block 304, the process 300 involves generating keypoint tracks for each video frame of the video frames 104 or any subset thereof. The keypoint tracks may each track motion of a respective key point that is stationary with respect to a stationary point of reference. The tracked motion represented by the keypoint tracks may result from motion of the camera or other device used to capture images of the respective key points.

The computing device can select an initial video frame of the video frames 104. The initial video frame may be or include a first (e.g., chronologically) video frame, though other suitable initial video frames can be identified and selected by the computing device. The computing device can mask moving objects, such as the moving objects 110, included in the initial video frame. For example, the computing device can identify objects indicated in the initial video frame that are likely to move or that are likely to be in motion. Examples of moving objects can include people, cars, doors, and the like. In some embodiments, the computing device can use a semantic segmentation network to mask the moving objects, though other suitable computer algorithms, machine-learning models, and the like can be used by the computing device to mask the moving objects. In some embodiments, masking the moving objects may involve identifying a first set of pixels that indicate the moving objects.

The computing device can additionally mask or otherwise identify feature-rich key points, such as the feature-rich key points 112, included in the initial video frame. In some embodiments, the computing device can use a feature detector or a key point detector to detect the feature-rich key points in an area that excludes the first set of pixels. The feature detector or the key point detector can be or include a rotation equivariant keypoint detector (REKD), though any other suitable feature detector or key point detector can be used by the computing device to identify the feature-rich key points. In some embodiments, the feature-rich key points may be or include points or pixels on the initial video frame that are easily tracked, that can convey more information than other points or pixels, and the like. In a particular example, the feature-rich key points of the initial video frame can include pixels indicating a desk having multiple corners, edges, shapes, and the like that are dense and that can easily be tracked across multiple video frames. The computing device can mask the feature-rich key points, and, in some examples, a predetermined area around the feature-rich key points, included in the initial video frame.

The computing device can also identify sampled additional key points included in the initial video frame. The sampled additional key points may be or include non-feature-rich key points included in the initial frame. The computing device can sample key points in the remaining non-masked regions of the initial frame to identify the sampled additional key points for the initial video frame. The feature-rich key points and the sampled additional key points of the initial video frame can be tracked by the computing device across multiple video frames to generate keypoint tracks.

In some embodiments, the computing device can use one or more keypoint trackers to propagate and track the feature-rich key points and the sampled additional key points of the initial video frame into the next N video frames, which may include one video frame, two video frames, three video frames, four video frames, five video frames, six video frames, seven video frames, eight video frames, or more video frames. The computing device can use dense kernelized feature matching (DKM) to compute pairwise dense image matching information between the initial video frame and future N frames. The pairwise dense image matching information can be used to initialize keypoint tracks for the feature-rich key points and the sampled additional key points of the initial video frame. The computing device can input the pairwise dense image matching information into a computer model, such as Persistent Independent Particles (PIPS), to generate and/or use information from N+1 frames to refine the keypoint tracks. The computing device can prune or otherwise refine the keypoint tracks. For example, any keypoint tracks modified by more than M pixels, where M can be one, two, three, four, five, six, or more, can be discarded as potentially erroneous keypoint tracks. Stated differently, the keypoint tracks can be pruned or otherwise refined when the networks or models used to generate the keypoint tracks disagree on a location of the respective keypoint track.

The computing device can repeat the above-described techniques for generating keypoint tracks for each subsequent video frame of the video frames, or any subset thereof. For example, the computing device can identify and/or mask moving objects in the subsequent video frames, can identify and/or mask feature-rich key points in the subsequent video frames, can identify and/or mask sampled additional key points in the subsequent video frames. Additionally, the computing device can identify and/or mask previously generated keypoint tracks. For example, the keypoint tracks from the initial video frame can be identified by the computing device for the subsequent video frames. The computing device can use the feature-rich key points, the sampled additional key points, and/or the previously generated keypoint tracks to generate keypoint tracks for the subsequent video frames. For example, the computing device can use REKD, DKM, PIPS, other suitable computer models, computer algorithms, machine-learning models, and the like to generate the keypoint tracks for the subsequent video frames based on the feature-rich key points, the sampled additional key points, and/or the previously generated keypoint tracks of the subsequent video frames.

In some embodiments, the computing device can further refine the keypoint tracks of the initial video frame and/or the subsequent video frames. For example, the computing device can execute a computer algorithm, such as Perfect Pixel Structure From Motion or any other computer algorithm, computer model, machine-learning model, etc., to further refine the keypoint tracks. Additionally, the computing device can determine and/or cache a metric depth, such as the metric depth 118, for the initial video frame and/or the subsequent video frames. For example, the computing device can use a deep neural network, such as ZoeDepth or any other suitable neural network, to determine the metric depth for each video frame of the video frames. The computing device can generate or otherwise access an image database, and the computing device can cache the metric depth, the keypoint tracks, the feature-rich key points, the sampled additional key points, the video frames, or any combination or subset thereof in the image database.

At block 306, the process 300 involves identifying a first video frame and a matching video frame from the image database. The computing device can generate and/or access the image database. The image database can include the key points, which can include the feature-rich key points and/or the sampled additional key points of the video frames, and keypoint match information between all pairs of video frames included in the image database. From the image database, the computing device can select the first video frame that has the most number of keypoint tracks. Additionally, the computing device can identify and/or select a matching video frame that includes the most number of matches of key points and/or keypoint tracks to key points and/or keypoint tracks of the first video frame.

At block 308, the process 300 involves projecting the first video frame and the matching video frame into a three-dimensional model. The computing device can sample (e.g., uniformly) focal lengths for a camera that captured the first video frame and the matching video frame. In a particular example, the sampled focal lengths can include focal lengths from 0.25 of a maximum video frame dimension to four times the maximum video frame dimension, though other suitable focal lengths are possible. Additionally, the number of sampled focal lengths can be approximately two, approximately four, approximately eight, approximately 16, approximately 32, approximately 64, approximately 128, approximately 256, or other suitable number greater than 256 or between two and 256.

For each focal length in the sampled focal lengths, the computing device can use (i) the cached metric depth corresponding to the first video frame and/or the matching video frame and (ii) the respective focal length to project the key points of the first video frame and/or the matching video frame to a three-dimensional model such as a three-dimensional point cloud. The computing device can determine an estimated camera position of the first video frame, for example relative to the initial video frame, using a computer algorithm. The computer algorithm may be or include the Perspective-n-Point (PnP) algorithm, though any other suitable computer algorithm, computer model, machine-learning model, and the like can be used by the computing device to determine the estimated camera position. The computing device can select or otherwise identify the focal length and estimated camera position combination that produces the best fit computer model or that otherwise best satisfies a solution to the computer model to generate the projection.

At block 310, the process 300 involves determining a camera position based on the projection. The computing device can use the selected focal length and estimated camera position corresponding to the selected focal length to triangulate the matching key points of the matching video frame. In some embodiments, the computing device can use two-view triangulation, though other suitable types of triangulation are possible. Additionally or alternatively, the computing device can use depth information, such as the metric depth, instead of triangulation in examples in which a difference between estimated camera positions of the first video frame and the matching video frame is small, negligible, or zero. For the recovered camera position, the computing device can run a bundle adjustment with a depth constraint to refine the recovered camera position. In response to recovering the camera position for the first video frame and/or the matching video frame, the computing device can select a second video frame from the image database and repeat techniques, such as those described with respect to the block 306, the block 308, and/or the block 310, to recover the camera position for the second video frame and any subsequent video frame selected from the image database.

Figure 4:
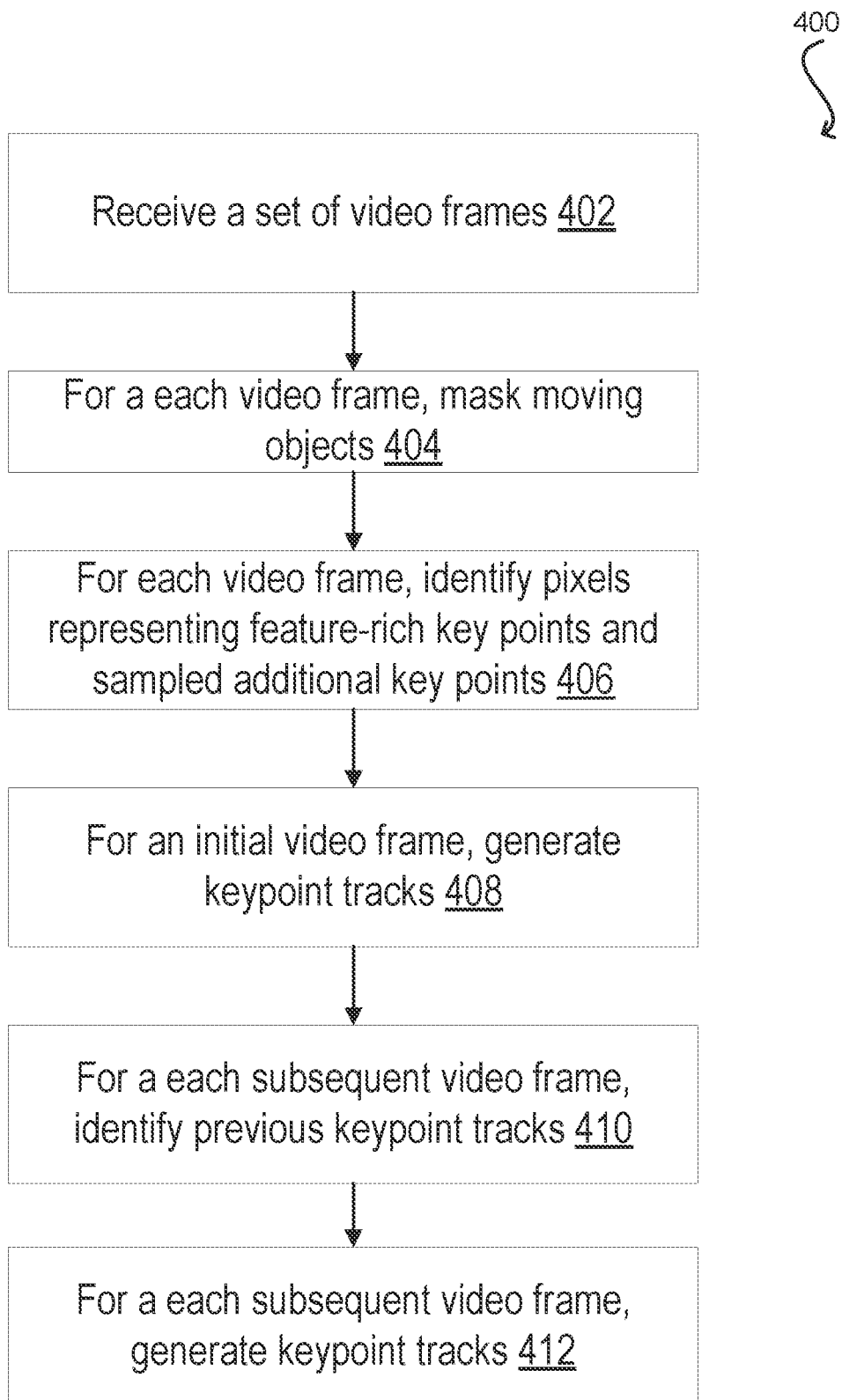
FIG. 4 illustrates a flowchart of a process for generating keypoint tracks for a set of video frames in accordance with at least one embodiment.

FIG. 4 illustrates a flowchart of a process 400 for generating keypoint tracks for a set of video frames in accordance with at least one embodiment. Some or all of the process 400 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

At block 402, the process 400 involves receiving a set of video frames such as the video frames 104. In some embodiments, the computing device may query or otherwise access a data store that includes a content file such as the content file 102. In other examples, the computing device may receive the content file 102 from a separate computing device. The computing device can split the content file 102 into the video frames 104 or may otherwise extract the video frames 104 from the content file 102.

At block 404, the process 400 involves masking moving objects such as the moving objects 110 and/or the moving objects 124. The computing device can identify an initial video frame, which may be a first chronological video frame, and/or subsequent video frames from the video frames 104. The computing device can mask the moving objects indicated in the initial video frame and/or the subsequent video frames. The computing device can use a semantic segmentation network, or any other suitable network, model, algorithm, etc., to identify the moving objects and mask the moving objects. In some embodiments, the moving objects may be or include people, cars, doors, and other objects in motion or otherwise configured to move with respect to a stationary reference point. Masking the moving objects may involve identifying a first set of pixels that represents the moving objects and labeling, tagging, or otherwise indicating the first set of pixels as the mask or as including the moving objects. The mask for the first set of pixels may cause the first set of pixels to be ignored, to not be tracked, etc. in subsequent processing of the initial video frame and/or the subsequent video frames.

At block 406, the process 400 involves identifying (i) feature-rich key points, such as the feature-rich key points 112 and/or the feature-rich key points 126, and (ii) sampled additional key points such as the sampled additional key points 114 and/or the sampled additional key points 128. The computing device can identify the feature-rich key points and/or the sampled additional key points in the initial video frame and/or the subsequent video frames by using a feature detector such as REKD, by sampling other key points included in the initial video frame and/or the subsequent video frames, etc. For example, the computing device can execute the feature detector on pixels excluding the first set of pixels of the initial video frame and/or the subsequent video frame and can receive at least an indication of the feature-rich key points indicated by the initial video frame and/or the subsequent video frames. Additionally or alternatively, the computing device can sample remaining key points not indicated by the feature detector as feature-rich key points to identify the sampled additional key points of the initial video frame and/or the subsequent video frame. In some embodiments, the feature detector can identify (i) a second set of pixels included in the initial video frame and/or the subsequent video frames that indicates the feature-rich key points, and (ii) a third set of pixels included in the initial video frame and/or the subsequent video frames that indicates the sampled additional key points. The computing device can apply a mask to the second set of pixels and, in some examples, to a small area of pixels around each pixel included in the second set of pixels. Masking the feature-rich key points may involve labeling, tagging, or otherwise indicating the second set of pixels as the mask or as including the feature-rich key points. The sampled additional key points can be sampled among pixels not included in the first set of pixels or in the second set of pixels.

At block 408, the process 400 involves generating a set of keypoint tracks for the initial video frame. Using the feature-rich key points and the sampled additional key points, the computing device can generate or otherwise identify keypoint tracks for the initial video frame. In some embodiments, the computing device can use one or more keypoint trackers to propagate and track the feature-rich key points and the sampled additional key points of the initial video frame into the next N video frames. In some examples, the propagation or tracking can be performed by a neural network. The computing device can use DKM to compute pairwise dense image matching information between the initial video frame and future N frames. The pairwise dense image matching information can be used to initialize keypoint tracks for the feature-rich key points and the sampled additional key points of the initial video frame. The computing device can input the pairwise dense image matching information into a computer model, such as PIPS, to generate and/or use information from N+1 frames to refine the keypoint tracks. The computing device can prune or otherwise refine the keypoint tracks. For example, any keypoint tracks modified by more than M pixels can be discarded as potentially erroneous keypoint tracks. Stated differently, the keypoint tracks can be pruned or otherwise refined when the networks or models used to generate the keypoint tracks disagree on a location of the respective keypoint track.

At block 410, the process 400 involves identifying and/or masking previous keypoint tracks. The computing device can, for each subsequent video frame, identify previously generated or identified keypoint tracks such as the previous keypoint tracks 130. The previous keypoint tracks 130 can include previously identified keypoint tracks, stored keypoint tracks, or the like. For example, the previous keypoint tracks 130 can include the keypoint tracks determined at the block 408 for the initial video frame, though other suitable previously identified or stored keypoint tracks can be included in the previous keypoint tracks 130. Masking the previous keypoint tracks may involve applying a fourth mask, a fourth tag, or the like to a fourth set of pixels included in the subsequent video frame that indicates or represents the previous keypoint tracks.

At block 412, the process 400 involves generating keypoint tracks for the subsequent video frames. The computing device can repeat the above-described techniques, for example with respect to the block 408, for generating keypoint tracks for each subsequent video frame of the video frames, or any subset thereof. For example, the computing device can use the feature-rich key points, the sampled additional key points, and/or the previously generated keypoint tracks to generate keypoint tracks for the subsequent video frames. For example, the computing device can use REKD, DKM, PIPS, other suitable computer models, computer algorithms, machine-learning models, and the like to generate the keypoint tracks for the subsequent video frames based on the feature-rich key points, the sampled additional key points, and/or the previously generated keypoint tracks of the subsequent video frames.

In some embodiments, the computing device can further refine the keypoint tracks of the initial video frame and/or the subsequent video frames. For example, the computing device can execute a computer algorithm, such as Perfect Pixel Structure From Motion or any other computer algorithm, computer model, machine-learning model, etc., to further refine the keypoint tracks. Additionally, the computing device can determine and/or cache a metric depth, such as the metric depth 118, for the initial video frame and/or the subsequent video frames. For example, the computing device can use a deep neural network, such as ZoeDepth or any other suitable neural network, to determine the metric depth for each video frame of the video frames. The computing device can generate or otherwise access an image database, and the computing device can cache the metric depth, the keypoint tracks, the feature-rich key points, the sampled additional key points, the video frames, or any combination or subset thereof in the image database.

Figure 5:
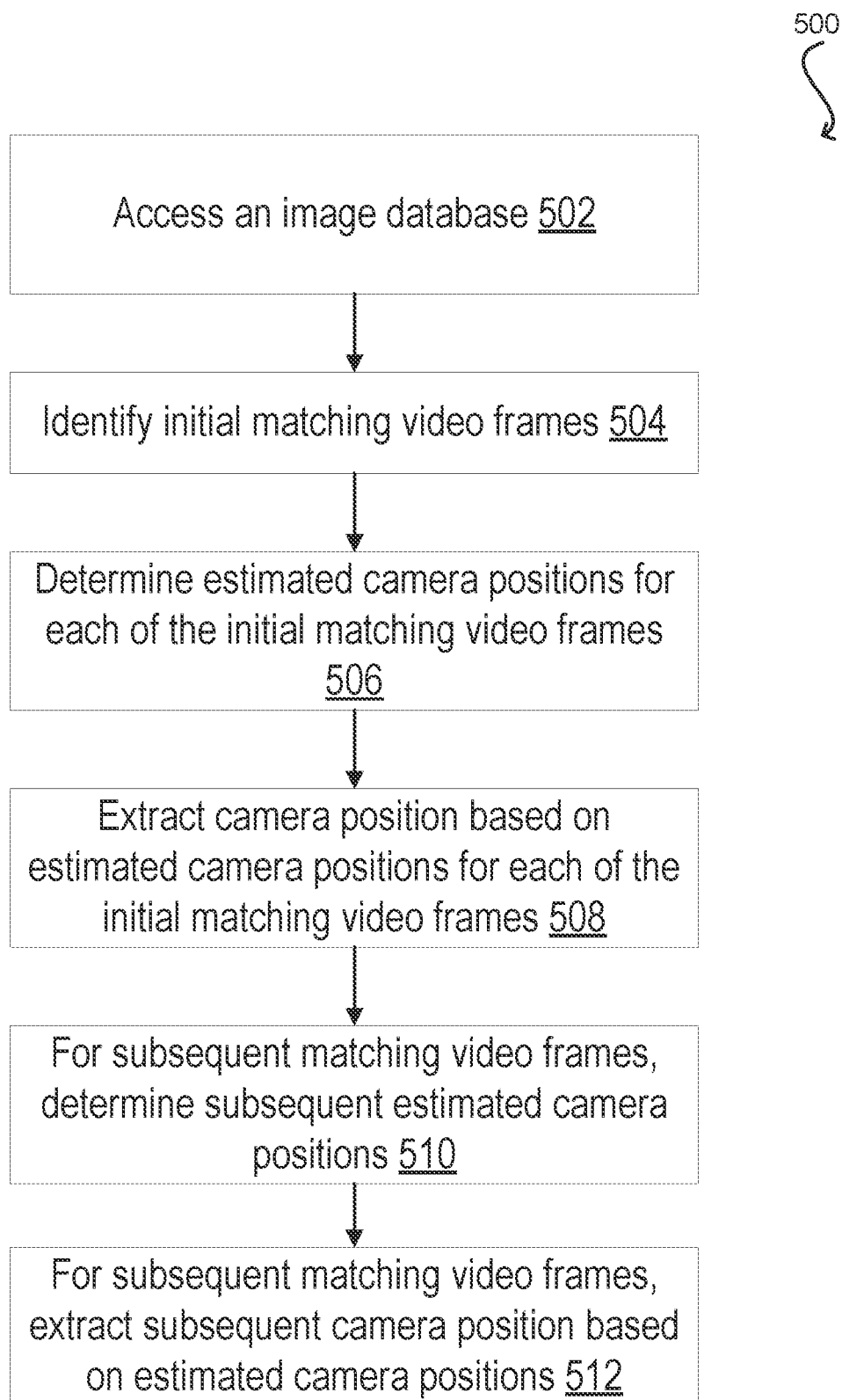
FIG. 5 illustrates a flowchart of a process for determining a camera position based on video frames accessed from an image database in accordance with at least one embodiment.

FIG. 5 illustrates a flowchart of a process 500 for determining a camera position based on video frames accessed from an image database in accordance with at least one embodiment. Some or all of the process 500 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

At block 502, the process 500 involves accessing an image database such as the image database 101. The computing device can generate and/or access the image database. The image database can include the key points, which can include the feature-rich key points and/or the sampled additional key points of the video frames, and keypoint match information between all pairs of video frames included in the image database.

At block 504, the process 500 involves identifying initial matching video frames from the image database. From the image database, the computing device can select a first video frame that has the most number of keypoint tracks. Additionally, the computing device can identify and/or select a matching video frame that includes the most number of matches of key points and/or keypoint tracks to key points and/or keypoint tracks of the first video frame.

At block 506, the process 500 involves determining estimated camera positions for the first video frame and/or the matching video frame. The computing device can determine the estimated camera positions, such as the estimated camera positions 208, of the first video frame and/or the matching video frame using a computer algorithm, a machine-learning model, or the like. In a particular example, the computing device can use the PnP algorithm to determine the estimated camera positions. The computing device can select the focal length and estimated camera position among the potential focal lengths and the estimated camera positions that produce the best fit or best solution to the computer algorithm, the machine-learning model, or the like. In some examples, the estimated camera positions may be determined based on a projection of key points of the first video frame and/or the matching video frame into a three-dimensional model.

At block 508, the process 500 involves extracting or otherwise determining the camera position based on the estimated camera positions. The computing device can use the selected focal length and estimated camera position corresponding to the selected focal length to triangulate the matching key points of the matching video frame and/or the first video frame. In some embodiments, the computing device can use two-view triangulation, though other suitable types of triangulation are possible. Additionally or alternatively, the computing device can use depth information, such as the metric depth, instead of triangulation in examples in which a difference between estimated camera positions of the first video frame and the matching video frame is small, negligible, or zero. For the recovered camera position, the computing device can run a bundle adjustment with a depth constraint to refine the recovered camera position.

At block 510, the process 500 involves determining subsequent estimated camera positions for subsequently selected video frames. For example, the computing device can select one or more subsequent video frames from which to recover a subsequent camera position. The computing device can select the subsequent video frame that has the next-highest number of matching keypoint tracks compared to keypoint tracks of the first video frame. In other examples, the computing device can identify the subsequent video frame having the next-highest number of keypoint tracks compared with the keypoint tracks of the first video frame, and the computing device can identify a subsequent matching video frame that includes a highest number of matching keypoint tracks with respect to the keypoint tracks of the subsequent video frame.

The computing device can determine the estimated camera positions, such as the estimated camera positions 208, of the subsequent video frame and/or the subsequent matching video frame using a computer algorithm, a machine-learning model, or the like. In a particular example, the computing device can use the PnP algorithm to determine the estimated camera positions. The computing device can select the focal length and estimated camera position among the potential focal lengths and the estimated camera positions that produce the best fit or best solution to the computer algorithm, the machine-learning model, or the like. In some examples, the estimated camera positions may be determined based on a projection of key points of the subsequent video frame and/or the subsequent matching video frame into a three-dimensional model.

At block 512, the process 500 involves extracting or otherwise determining the camera position based on the estimated camera positions of the subsequent video frame and/or the subsequent matching video frame. The computing device can use the selected focal length and estimated camera position corresponding to the selected focal length to triangulate the matching key points of the subsequent matching video frame and/or the subsequent video frame. In some embodiments, the computing device can use two-view triangulation, though other suitable types of triangulation are possible. Additionally or alternatively, the computing device can use depth information, such as the metric depth, instead of triangulation in examples in which a difference between estimated camera positions of the subsequent video frame and the subsequent matching video frame is small, negligible, or zero. For the recovered camera position, the computing device can run a bundle adjustment with a depth constraint to refine the recovered camera position.

Figure 6:
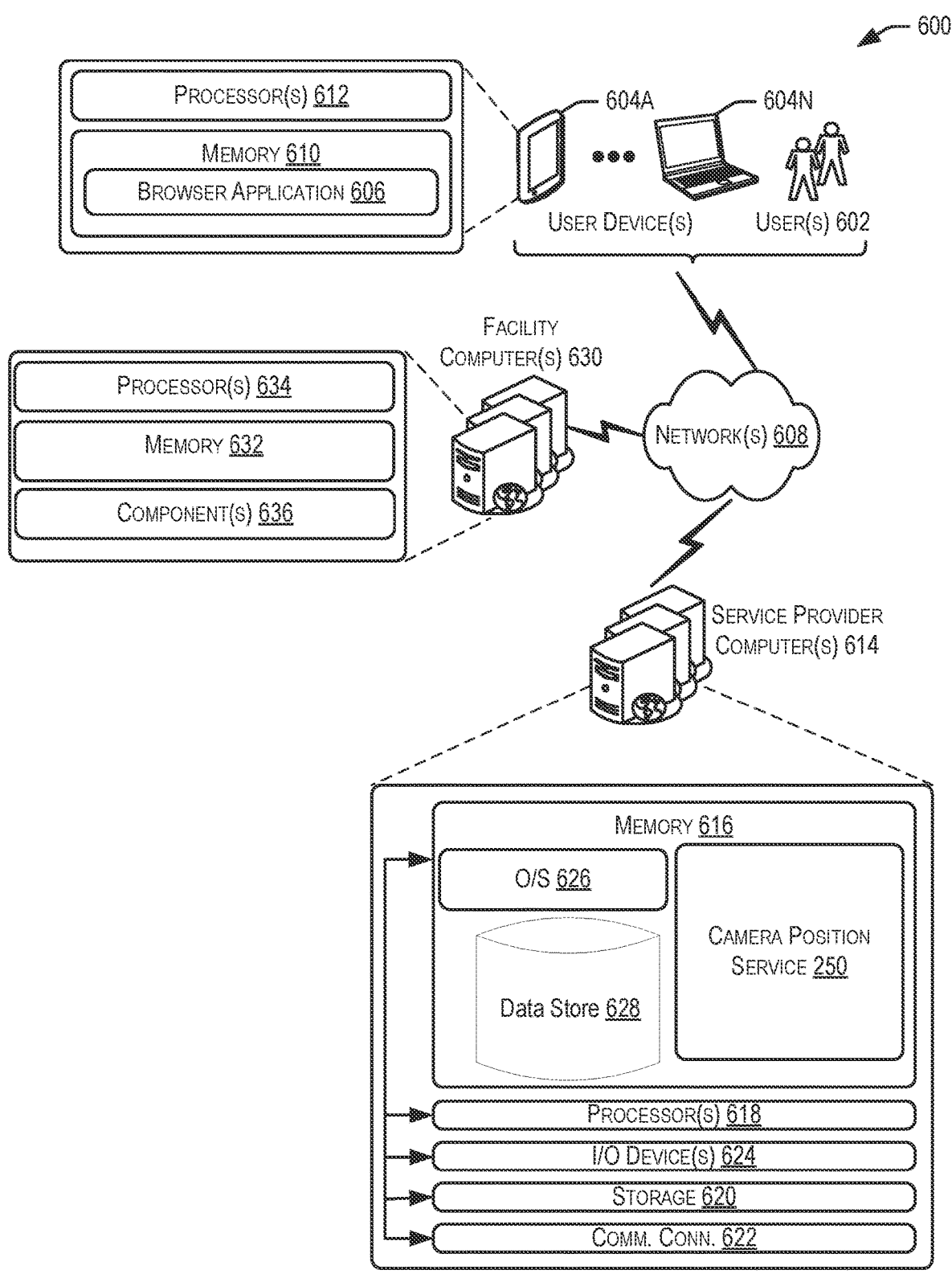
FIG. 6 illustrates an example architecture for a camera position service that includes one or more service provider computers, a user device, and one or more facility computers in accordance with at least one embodiment.

FIG. 6 illustrates an example of an architecture 600 for a camera position service, such as the camera position service 250, that includes one or more service provider computers, a user device, and one or more facility computers in accordance with at least one embodiment. In architecture 600, one or more users 602 (e.g., video editors and/or entities associated with computer systems implementing the camera position service 250) may utilize user computing devices 604A-N (collectively, user devices 604) to access a browser application 606 or a user interface (UI) accessible through the browser application 606 and via one or more networks 608, to receive image data, video data, or the like, which may be presented and interacted with via browser application 606 or the UI accessible through the browser application 606. The "browser application" 606 can be or include any browser control or native application that can access and/or display a network page or other information. A native application may include an application or program that has been developed for use on a particular platform, such as an operating system, or a particular device such as a particular type of mobile device.

In accordance with at least one embodiment, the user devices 604 may be configured for communicating with service provider computers 614 and facility computers 630 via networks 608. The user devices 604 may include at least one memory, such as memory 610, and one or more processing units or one or more processors 612. The memory 610 may store program instructions that are loadable and executable on the one or more processors 612, as well as data generated during the execution of these programs. Depending on the configuration and type of the user devices 604, the memory 610 may be volatile (such as random access memory (RAM)) and/or non-volatile (such as read-only memory (ROM), flash memory, etc.). The user devices 604 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program services, and other data for the user devices 604. In some implementations, the memory 610 may include multiple different types of memory, such as static random access memory (SRAM), dynamic random access memory (DRAM), or ROM, etc.

Turning to the contents of the memory 610 in more detail, the memory 610 may include an operating system and one or more application programs or services for implementing the features disclosed herein. Additionally, the memory 610 may include one or more services for implementing the features described herein such as the camera position service 250.

The architecture 600 may also include one or more service provider computers 614 that may, in some examples, provide computing resources such as, but not limited to, client entities, low latency data storage, durable data storage, data access, management, virtualization, hosted computing environment or "cloud-based" solutions, image refinement feature implementation, etc. The service provider computers 614 may implement or be an example of one or more machine-learning models or one or more service provider computers (e.g., the computing devices) described herein with reference to FIGS. 1-5 and throughout the disclosure. The one or more service provider computers 614 may also be operable to provide site hosting, computer application development, and/or implementation platforms, combinations of the foregoing, or the like to the one or more users 602 via user devices 604.

In some examples, the networks 608 may include any one or a combination of many different types of networks, such as cable networks, the Internet, wireless networks, cellular networks, and other private and/or public networks. While the illustrated examples represent the users 602 communicating with the service provider computers 614 over the networks 608, the described techniques may equally apply in instances where the users 602 interact with the one or more service provider computers 614 via the one or more user devices 604 over a landline phone, via a kiosk, or in any other manner. It is also noted that the described techniques may apply in other client/server arrangements, such as set-top boxes, etc., as well as in non-client/server arrangements such as locally stored applications, peer-to-peer arrangements, etc. In embodiments, the users 602 may communicate with the facility computers 630 via networks 608, and the facility computers 630 may communicate with the service provider computers 614 via networks 608. In some embodiments, the service provider computers 614 may communicate, via networks 608, with one or more third party computers (not pictured) to obtain data inputs for the various algorithms of the generation features described herein. In accordance with at least one embodiment, the service provider computers 614 may receive video data, image data, mask data, or the like for at least recovering a camera position.

The one or more service provider computers 614 may be or include any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computers 614 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or a distributed computing environment. In some examples, the one or more service provider computers 614 may be in communication with the user device 604 via the networks 608, or via other network connections. The one or more service provider computers 614 may include one or more servers, which may be arranged in a cluster or as individual servers not associated with one another. In embodiments, the service provider computers 614 may be in communication with one or more third party computers (not pictured) via networks 608 to receive or to otherwise obtain data including video data, image data, mask data, and the like for recovering the camera position.

In one illustrative configuration, the one or more service provider computers 614 may include at least one memory, such as memory 616, and one or more processing units or one or more processors 618. The one or more processors 618 may be implemented as appropriate in hardware, computer-executable instructions, firmware, or any combination thereof. Computer-executable instruction or firmware implementations of the one or more processors 618 may include computer-executable or machine-executable instructions written in any suitable programming language to perform the various functions described when executed by a hardware computing device such as a processor. The memory 616 may store program instructions that are loadable and executable on the one or more processors 618, as well as data generated during the execution of these programs. Depending on the configuration and type of the one or more service provider computers 614, the memory 616 may be volatile (such as RAM) and/or non-volatile (such as ROM, flash memory, etc.). The one or more service provider computers 614 or servers may also include additional storage 620, which may include removable storage and/or non-removable storage. The additional storage 620 may include, but is not limited to, magnetic storage, optical disks and/or tape storage. The disk drives and their associated computer-readable media may provide non-volatile storage of computer-readable instructions, data structures, program services, and other data for the computing devices. In some implementations, the memory 616 may include multiple different types of memory, such as SRAM, DRAM, or ROM, etc.

The memory 616, the additional storage 620, both removable and non-removable, are examples of non-transitory computer-readable storage media. For example, computer-readable storage media may include volatile or non-volatile, removable or non-removable media implemented in any method or technology for storage of information such as computer-readable instructions, data structures, program services, or other data. The memory 616 and the additional storage 620 are examples of non-transitory computer storage media. Additional types of non-transitory computer storage media that may be present in the one or more service provider computers 614 may include, but are not limited to, PRAM, SRAM, DRAM, RAM, ROM, EEPROM, flash memory or other memory technology, CD-ROM, DVD, or other optical storage, magnetic cassettes, magnetic tape, magnetic disk storage or other magnetic storage devices, or any other medium which can be used to store the desired information and which can be accessed by the one or more service provider computers 614. Combinations of any of the above should also be included within the scope of non-transitory computer-readable media.

The one or more service provider computers 614 may also include one or more communication connection interfaces 622 that can allow the one or more service provider computers 614 to communicate with a data store, another computing device or server, user terminals, and/or other devices on the networks 608. The one or more service provider computers 614 may also include one or more I/O devices 624, such as a keyboard, a mouse, a pen, a voice input device, a touch input device, a display, speakers, a printer, etc.

Turning to the contents of the memory 616 in more detail, the memory 616 may include an operating system 626, one or more data stores 628, and/or one or more application programs or services for implementing the features disclosed herein including the camera position service 250. The architecture 600 includes facility computers 630. In embodiments, the service provider computers 614 and the camera position service 250 may be configured to generate and transmit instructions, via networks 608, to components 636 in communication or otherwise associated with facility computers 630. For example, the instructions may be configured to activate or otherwise trigger the components 636 for determining or recovering the camera position. The facility computers 630 may include at least one memory, such as memory 632, and one or more processing units or one or more processors 634. The memory 632 may store program instructions, which may include one or more machine-learning models as disclosed herein, that can be loaded and executed on the one or more processors 634, as well as data generated during the execution of these programs. Depending on the configuration and type of the facility computers 630, the memory 632 may be volatile (such as random access memory (RAM)) and/or non-volatile (such as read-only memory (ROM), flash memory, etc.). The facility computers 630 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program services, and other data for the facility computers 630. In some implementations, the memory 632 may include multiple different types of memory, such as static random access memory (SRAM), dynamic random access memory (DRAM), or ROM, etc.

Turning to the contents of the memory 632 in more detail, the memory 632 may include an operating system and one or more application programs or services for implementing the features disclosed herein. Additionally, the memory 632 may include one or more services for implementing the features described herein including the camera position service 250. In some embodiments, the service provider computers 614 and the camera position service 250 may determine or recover a camera position based on an input image and/or video data or one or more video frames thereof. The user device 604 and the browser application 606 may be configured to update a presented user interface to present the camera position to user 602. In accordance with at least one embodiment, the camera position service 250 may be configured to receive a content file, data thereof, such as video data, video frames, etc., and the like. In embodiments, some, a portion, or all of these input data may be stored and transmitted as video files or other files including video data. In accordance with at least one embodiment, each data input, or any subset thereof, may be extracted from the content file, one or more video frames included therein, an image database, or any combination thereof. In some embodiments, the camera position service 250 may be configured to implement one or more machine-learning models, computer models, computer algorithms, etc., such as REKD, DKM, PIPS, PnP, and the like to generate key points, to generate keypoint tracks, to recover the camera position, and the like.

The camera position service 250 may be configured to generate and transmit a user interface or data objects for updating a user interface presented via browser application 606 and user device 604 for presenting the camera position, or any components thereof or associated therewith to the user 602. Other graphical updates, feedback mechanisms, and data object generation associated with the camera position features described herein may be implemented by the service provider computers 614 and/or the camera position service 250.

Figure 7:
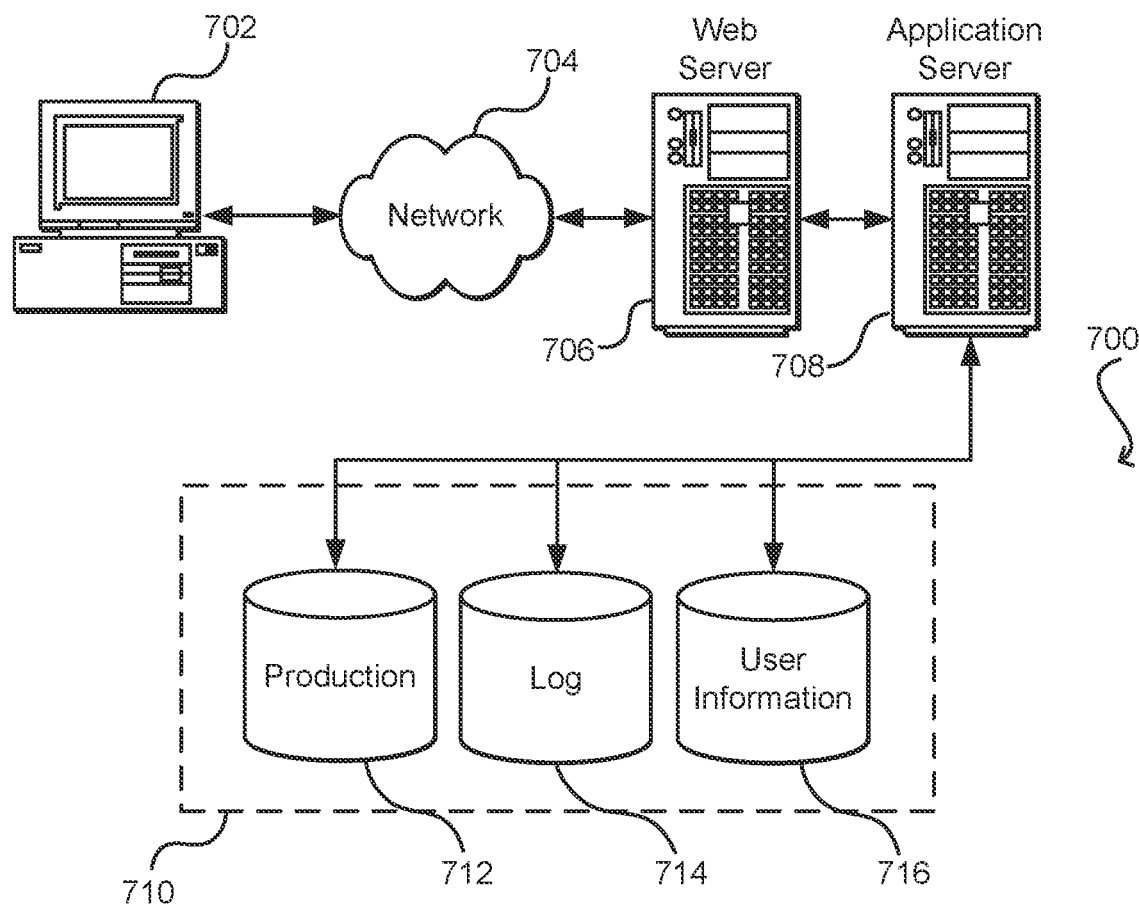
FIG. 7 illustrates an environment in which various embodiments can be implemented.

FIG. 7 illustrates aspects of an example of an environment 700 for implementing aspects in accordance with various embodiments. As will be appreciated, although a Web-based environment is used for purposes of explanation, different environments may be used, as appropriate, to implement various embodiments. The environment includes an electronic client device 702, which can include any appropriate device operable to send and receive requests, messages, or information over an appropriate network 704 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 706 for receiving requests and serving content in response thereto, although for other networks an alternative device serving a similar purpose could be used as would be apparent to one of ordinary skill in the art.

The illustrative environment includes at least one application server, such as application server 708, and a data store 710. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the electronic client device 702 and the application server 708, can be handled by the Web server. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing production data 712 and user information 716, which can be used to serve content for the production side. The data store also is shown to include a mechanism for storing log data 714, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the electronic client device 702. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the environment 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    receiving a plurality of video frames from a content file;
    for a first video frame of the plurality of video frames:
        identifying first feature-rich key points and first sampled additional key points; and
        generating first keypoint tracks based on the first feature-rich key points and the first sampled additional key points;
    for each subsequent video frame of the plurality of video frames:
        identifying second feature-rich key points and second sampled additional key points;
        identifying previously generated keypoint tracks from previously analyzed video frames of the plurality of video frames; and
        generating second keypoint tracks based on the second feature-rich key points, the second sampled additional key points, and the previously generated keypoint tracks;
    determining, for each video frame of the plurality of video frames, a metric depth;
    generating an image database using the first keypoint tracks, the second keypoint tracks, and the metric depth of each video frame of the plurality of video frames, the image database comprising the plurality of video frames and indications of the first feature-rich key points, the second feature-rich key points, the first sampled additional key points, and the second sampled additional key points;
    for a first particular video frame of the plurality of video frames that has a highest number of keypoint tracks among the plurality of video frames:
        identifying, from the image database, a first matching video frame of the plurality of video frames, the first matching video frame having a most number of keypoint tracks matching the highest number of keypoint tracks of the first particular video frame;
        generating, based on the metric depth, a first projection of the first particular video frame and of the first matching video frame into a three-dimensional model of an image indicated by the first particular video frame and of the first matching video frame, the first projection including first estimated camera positions for the first particular video frame and for the first matching video frame; and
        determining a first camera position for the first particular video frame and for the first matching video frame using the first projection; and
    for a second particular video frame of the plurality of video frames that has a next-highest number of keypoint tracks among the plurality of video frames:
        identifying, from the image database, a second matching video frame of the plurality of video frames, the second matching video frame having the most keypoint tracks matching the next-highest number of keypoint tracks of the second particular video frame;
        generating, based on the metric depth, a second projection of the second particular video frame and of the second matching video frame into a three-dimensional model of an image indicated by the second particular video frame and of the second matching video frame, the second projection including second estimated camera positions for the second particular video frame and for the second matching video frame; and
        determining a second camera position for the second particular video frame and for the second matching video frame using the second projection.

2. The computer-implemented method of claim 1, wherein identifying the first feature-rich key points comprises:
    masking a first set of pixels included in the first video frame, the first set of pixels including one or more moving objects; and
    identifying a second set of pixels included in the first video frame, the second set of pixels comprising the first feature-rich key points and excluding the first set of pixels.

3. The computer-implemented method of claim 2, wherein identifying the first sampled additional key points comprises identifying a third set of pixels included in the first video frame, the third set of pixels including the first sampled additional key points included in the first video frame and excluding the first set of pixels, wherein the third set of pixels is different than the first set of pixels and the second set of pixels.

4. The computer-implemented method of claim 1, wherein generating first keypoint tracks based on the first feature-rich key points and the first sampled additional key points comprises tracking the first feature-rich key points and the first sampled additional key points across one or more subsequent video frames of the plurality of video frames after the first video frame.

5. A non-transitory computer-readable medium comprising instructions that are executable by a processing device for causing the processing device to perform operations comprising:
    receiving a plurality of video frames from a content file;
    generating keypoint tracks for each video frame of the plurality of video frames;
    determining a metric depth for each video frame of the plurality of video frames;

generating an image database using the keypoint tracks and the metric depth of each video frame of the plurality of video frames, the image database comprising the plurality of video frames;

for a first particular video frame of the plurality of video frames that has a highest number of keypoint tracks among the plurality of video frames:
  generating, based on the metric depth, a first projection of the first particular video frame and of a first matching video frame into a three-dimensional model of an image indicated by the first particular video frame and of the first matching video frame; and
  determining a first camera position for the first particular video frame and for the first matching video frame using the first projection; and for a second particular video frame of the plurality of video frames that has a next-highest number of keypoint tracks among the plurality of video frames:
  generating, based on the metric depth, a second projection of the second particular video frame and of a second matching video frame into a three-dimensional model of an image indicated by the second particular video frame and of the second matching video frame; and
  determining a second camera position for the second particular video frame and for the second matching video frame using the second projection.

6. The non-transitory computer-readable medium of claim 5, wherein generating the first projection of the first particular video frame and of the first matching video frame comprises identifying, from the image database, the first matching video frame of the plurality of video frames, wherein the first matching video frame has a most number of keypoint tracks matching the highest number of keypoint tracks of the first particular video frame.

7. The non-transitory computer-readable medium of claim 6, wherein generating the second projection of the second particular video frame and of the second matching video frame comprises identifying, from the image database, the second matching video frame of the plurality of video frames, wherein the second matching video frame has the most keypoint tracks matching the next-highest number of keypoint tracks of the second particular video frame.

8. The non-transitory computer-readable medium of claim 5, wherein generating the keypoint tracks for each video frame of the plurality of video frames comprises, for an initial video frame:
  identifying feature-rich key points and sampled additional key points included in the initial video frame; and
  generating the keypoint tracks based on the feature-rich key points and the sampled additional key points.

9. The non-transitory computer-readable medium of claim 8, wherein identifying the feature-rich key points comprises:
  masking a first set of pixels included in the initial video frame, the first set of pixels including one or more moving objects; and
  identifying a second set of pixels included in the initial video frame, the second set of pixels comprising the feature-rich key points and excluding the first set of pixels.

10. The non-transitory computer-readable medium of claim 9, wherein identifying the sampled additional key points comprises identifying a third set of pixels included in the initial video frame, the third set of pixels including the sampled additional key points included in the initial video frame and excluding the first set of pixels, wherein the third set of pixels is different than the first set of pixels and the second set of pixels.

11. The non-transitory computer-readable medium of claim 10, wherein generating the keypoint tracks based on the feature-rich key points and first sampled additional key points comprises tracking the feature-rich key points and the sampled additional key points across one or more subsequent video frames of the plurality of video frames after the initial video frame.

12. The non-transitory computer-readable medium of claim 8, wherein generating the keypoint tracks comprises generating second keypoint tracks for each subsequent video frame of the plurality of video frames by:
  identifying second feature-rich key points and second sampled additional key points;
  identifying previously generated keypoint tracks from previously analyzed video frames of the plurality of video frames, wherein the previously generated keypoint tracks comprise the keypoint tracks; and
  generating the second keypoint tracks based on the second feature-rich key points, the second sampled additional key points, and the previously generated keypoint tracks.

13. The non-transitory computer-readable medium of claim 5, wherein generating the first projection of the first particular video frame and of the first matching video frame into the three-dimensional model comprises projecting each key point included in the first particular video frame and in the first matching video frame into the three-dimensional model by using the metric depth and a set of focal lengths associated with the first particular video frame and the first matching video frame, and wherein each focal length of the set of focal lengths is configured to be estimated using a size of the first particular video frame or the first matching video frame and a set of camera properties of the first particular video frame or the first matching video frame.

14. The non-transitory computer-readable medium of claim 5, wherein determining the metric depth for each video frame of the plurality of video frames comprises using a neural network to determine the metric depth, and wherein generating the keypoint tracks comprises using a neural network to generate the keypoint tracks for each video frame of the plurality of video frames.

15. The non-transitory computer-readable medium of claim 5, wherein determining the first camera position for the first particular video frame and for the first matching video frame using the first projection comprises:
  determining a first estimated camera position for the first particular video frame and a second estimated camera position for the first matching video frame; and
  determining the first camera position by triangulating the first estimated camera position and the second estimated camera position.

16. The non-transitory computer-readable medium of claim 15, wherein determining the first camera position for the first particular video frame and for the first matching video frame using the first projection further comprises using the metric depth to determine the first camera position.

17. A computer system comprising:
  a memory configured to store computer-executable instructions; and
  a processor in communication with the memory configured to execute the computer-executable instructions to perform operations comprising:
    receive a plurality of video frames from a content file;

generate keypoint tracks for each video frame of the plurality of video frames;
determine a metric depth for each video frame of the plurality of video frames;
generate an image database using the keypoint tracks and the metric depth of each video frame of the plurality of video frames, the image database comprising the plurality of video frames;
for a first particular video frame of the plurality of video frames that has a highest number of keypoint tracks among the plurality of video frames:
  generate, based on the metric depth, a first projection of the first particular video frame and of a first matching video frame into a three-dimensional model of an image indicated by the first particular video frame and of the first matching video frame; and
  determine a first camera position for the first particular video frame and for the first matching video frame using the first projection; and
for a second particular video frame of the plurality of video frames that has a next-highest number of keypoint tracks among the plurality of video frames:
  generate, based on the metric depth, a second projection of the second particular video frame and of a second matching video frame into a three-dimensional model of an image indicated by the second particular video frame and of the second matching video frame; and
  determine a second camera position for the second particular video frame and for the second matching video frame using the second projection.

18. The computer system of claim 17, wherein:
generating the first projection of the first particular video frame and of the first matching video frame comprises identifying, from the image database, the first matching video frame of the plurality of video frames, wherein the first matching video frame has a most number of keypoint tracks matching the highest number of keypoint tracks of the first particular video frame; and
generating the second projection of the second particular video frame and of the second matching video frame comprises identifying, from the image database, the second matching video frame of the plurality of video frames, wherein the second matching video frame has the most keypoint tracks matching the next-highest number of keypoint tracks of the second particular video frame.

19. The computer system of claim 17, wherein:
generating the keypoint tracks for each video frame of the plurality of video frames comprises:
  identifying feature-rich key points and sampled additional key points included in the video frame; and
  generating the keypoint tracks based on the feature-rich key points and the sampled additional key points; and
identifying the feature-rich key points comprises:
  masking a first set of pixels included in the video frame, the first set of pixels including one or more moving objects; and
  identifying a second set of pixels included in the video frame, the second set of pixels comprising the feature-rich key points and excluding the first set of pixels.

20. The computer system of claim 17, wherein:
determining the first camera position for the first particular video frame and for the first matching video frame using the first projection comprises:
  determining a first estimated camera position for the first particular video frame and a second estimated camera position for the first matching video frame; and
  determining the first camera position by triangulating the first estimated camera position and the second estimated camera position; and
determining the first camera position for the first particular video frame and for the first matching video frame using the first projection further comprises using the metric depth to determine the first camera position.

* * * * *